United States Patent
Sato et al.

(10) Patent No.: US 7,914,930 B2
(45) Date of Patent: Mar. 29, 2011

(54) METHOD FOR PRODUCING NON-AQUEOUS ELECTROLYTE SECONDARY BATTERY

(75) Inventors: Toshitada Sato, Osaka (JP); Hideharu Takezawa, Nara (JP); Syoichi Imashiku, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 1168 days.

(21) Appl. No.: 11/600,103

(22) Filed: Nov. 16, 2006

(65) Prior Publication Data

US 2007/0204457 A1     Sep. 6, 2007

(30) Foreign Application Priority Data

Jan. 10, 2006  (JP) .................................. 2006-002802

(51) Int. Cl.
*H01M 4/48*  (2010.01)

(52) U.S. Cl. .................. 429/231.95; 429/209; 29/623.3; 29/623.5

(58) Field of Classification Search ............. 429/231.95, 429/209; 29/623.3, 623.5

See application file for complete search history.

(56) References Cited

U.S. PATENT DOCUMENTS

| 6,371,995 | B1 * | 4/2002 | Yasunami | 29/623.1 |
| 6,761,744 | B1 * | 7/2004 | Tsukamoto et al. | 29/623.3 |
| 2006/0121345 | A1 * | 6/2006 | Yasuda et al. | 429/209 |
| 2007/0059601 | A1 * | 3/2007 | Natsume et al. | 429/218.1 |

FOREIGN PATENT DOCUMENTS

| JP | 6-325765 | 11/1994 |
| JP | 2002-083594 | 3/2002 |
| JP | 2005-38720 | 2/2005 |
| WO | WO 96/27910 | 9/1996 |
| WO | WO 2004097962 A1 * | 11/2004 |
| WO | WO 2005055345 A1 * | 6/2005 |

* cited by examiner

*Primary Examiner* — Dah-Wei D Yuan
*Assistant Examiner* — Zachary Best
(74) *Attorney, Agent, or Firm* — McDermott Will & Emery LLP

(57) ABSTRACT

A non-aqueous electrolyte secondary battery having both high capacity and long-life is provided by solving the problem of the large irreversible capacity of a negative electrode active material. The non-aqueous electrolyte secondary battery is produced by a method including the steps of: reacting lithium with a negative electrode active material by bringing a metal film that is composed mainly of lithium into contact with a surface of a negative electrode active material layer; and thereafter combining the negative electrode with a positive electrode to form an electrode assembly. The metal film composed mainly of lithium is preferably formed on a carrier that does not chemically react with lithium, and the metal film on the carrier is preferably brought into contact with the negative electrode active material layer while heating and applying a pressure thereto.

7 Claims, 2 Drawing Sheets

METHOD FOR PRODUCING NON-AQUEOUS ELECTROLYTE SECONDARY BATTERY

FIELD OF THE INVENTION

The present invention relates to a non-aqueous electrolyte secondary battery with high capacity and long life, and, particularly, to a method for producing the negative electrode thereof.

BACKGROUND OF THE INVENTION

An extensive research and development has been conducted on the use of lithium metal, which is capable of realizing high voltage and high energy density, as the negative electrode of non-aqueous electrolyte secondary batteries. This has lead to the current commercialization of lithium ion batteries that use a graphite material in the negative electrode, which material reversibly absorbs and desorbs lithium and provides good cycle life and safety.

However, the useful capacity of batteries using a graphite material-based negative electrode is approximately 350 mAh/g, which is very close to 372 mAh/g theoretical capacity of the graphite material. Therefore, as long as a graphite material is used in the negative electrode, it is not feasible to achieve a dramatic increase in capacity. Meanwhile, as the functions of portable appliances are becoming more and more sophisticated, non-aqueous electrolyte secondary batteries used as the energy source of such appliances are required to have higher capacities. Accordingly, in order to achieve higher capacities, negative electrode materials having a higher capacity than graphite become necessary.

Alloy materials containing silicon or tin are currently receiving attention as the materials that offer a higher capacity. Metal elements such as silicon are capable of electrochemically absorbing and desorbing lithium ions, thereby enabling a very-large-capacity charge/discharge in comparison with graphite materials. For example, it is known that silicon has a theoretical discharge capacity of 4199 mAh/g, which is 11 times higher than that of graphite. For example, Japanese Laid-Open Patent Publication No. 2002-83594 discloses a non-aqueous electrolyte secondary battery including a negative electrode that has a silicon thin film on a current collector. Also, Japanese Patent No. 2997741 discloses a non-aqueous electrolyte secondary battery that uses as an active material a silicon oxide, which has a lower capacity but offers a longer life than silicon.

However, an alloy material capable of electrochemically absorbing and desorbing lithium, such as silicon or a silicon oxide, has a very large irreversible capacity when used as a negative electrode active material. If the irreversible capacity is compensated for with lithium from the positive electrode, the positive electrode active material that cannot contribute to charge/discharge reactions increases, so that the capacity of the battery itself decreases.

Further, as described above, graphite is used as a negative electrode active material in common lithium ion batteries, and graphite also irreversibly loses capacity when it reacts with a non-aqueous electrolyte to form a film. Usually, this irreversible capacity is also compensated for with lithium from the positive electrode and, hence, the battery capacity decreases relative to the discharge capacity inherently delivered by the positive electrode.

In order to compensate for the irreversible capacity, for example, International Publication No. WO 96/27910 discloses affixing a lithium-based metal foil to an electrode assembly composed of negative and positive electrode sheets that are spirally wound together with a separator. This documents discloses that by aging the electrode assembly affixed with the metal foil after the injection of an electrolyte, lithium is preliminarily inserted into the negative electrode.

Further, Japanese Laid-Open Patent Publication No. 2005-38720 proposes forming a negative electrode mixture layer on a negative electrode current collector and forming thereon a light metal layer made of lithium metal by a dry film formation method such as vacuum evaporation or ion plating. This document discloses that by storing the negative electrode with the light metal layer in a dry atmosphere or an electrolyte, lithium ions are absorbed in the negative electrode mixture layer.

However, according to the approach of the above-mentioned WO 96/27910, lithium ions are unevenly diffused in the negative electrode after the aging, since the negative electrode has an area that is in contact with the lithium-based metal foil and an area that is not. Hence, when charge reaction is caused, lithium metal is deposited in the area of the negative electrode active material layer where excessive lithium ions are present. The deposited lithium metal eventually forms dendrites, thereby causing a trouble such as an internal short-circuit of the battery.

Also, according to the approach of the above-mentioned Japanese Laid-Open Patent Publication No. 2005-38720, the whole surface of the negative electrode can be evenly covered with lithium, unlike the approach of WO 96/27910. However, in the case of using vacuum evaporation, in particular, when lithium steam solidifies on the surface of the negative electrode active material layer, the negative electrode active material is subjected to the heat of solidification. Since this heat of solidification is very large, most binders made of, for example, an organic polymer are decomposed and become deteriorated due to heat.

Furthermore, it is widely known that an electrochemical process is applied to the negative electrode active material layer affixed with the lithium metal film, in order to compensate for the irreversible capacity. In this case, however, reaction tends to proceed unevenly, so that expansion due to the absorption of lithium becomes uneven, which may result in poor current collection.

BRIEF SUMMARY OF THE INVENTION

It is therefore an object of the present invention to improve these drawbacks and provide a non-aqueous electrolyte secondary battery having both high capacity and long life.

The present invention provides a method for producing a non-aqueous electrolyte secondary battery that includes: a positive electrode capable of electrochemically absorbing and desorbing lithium; a negative electrode capable of electrochemically absorbing and desorbing lithium, the negative electrode including an active material layer that comprises an active material, the active material layer being carried on a current collector; and a non-aqueous electrolyte. This method includes the steps of: reacting lithium with the active material of the negative electrode by bringing a metal film that is composed mainly of lithium into contact with a surface of the active material layer of the negative electrode; and thereafter combining the negative electrode with the positive electrode to form an electrode assembly.

According to the present invention, by bringing the metal film composed mainly of lithium (hereinafter referred to as the lithium-based metal film) into contact with the surface of the active material layer of the negative electrode to physically react the lithium with the active material of the negative electrode, the lithium is absorbed in the negative electrode active material before the electrode assembly is formed.

According to the present invention, it is therefore possible to make full use of high-capacity alloy materials as negative electrode active materials and solve the problem of the large irreversible capacity. Further, it is also possible to solve the problem of the irreversible capacity when the conventional graphite-based negative electrode is used in batteries and thus to realize high capacity.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
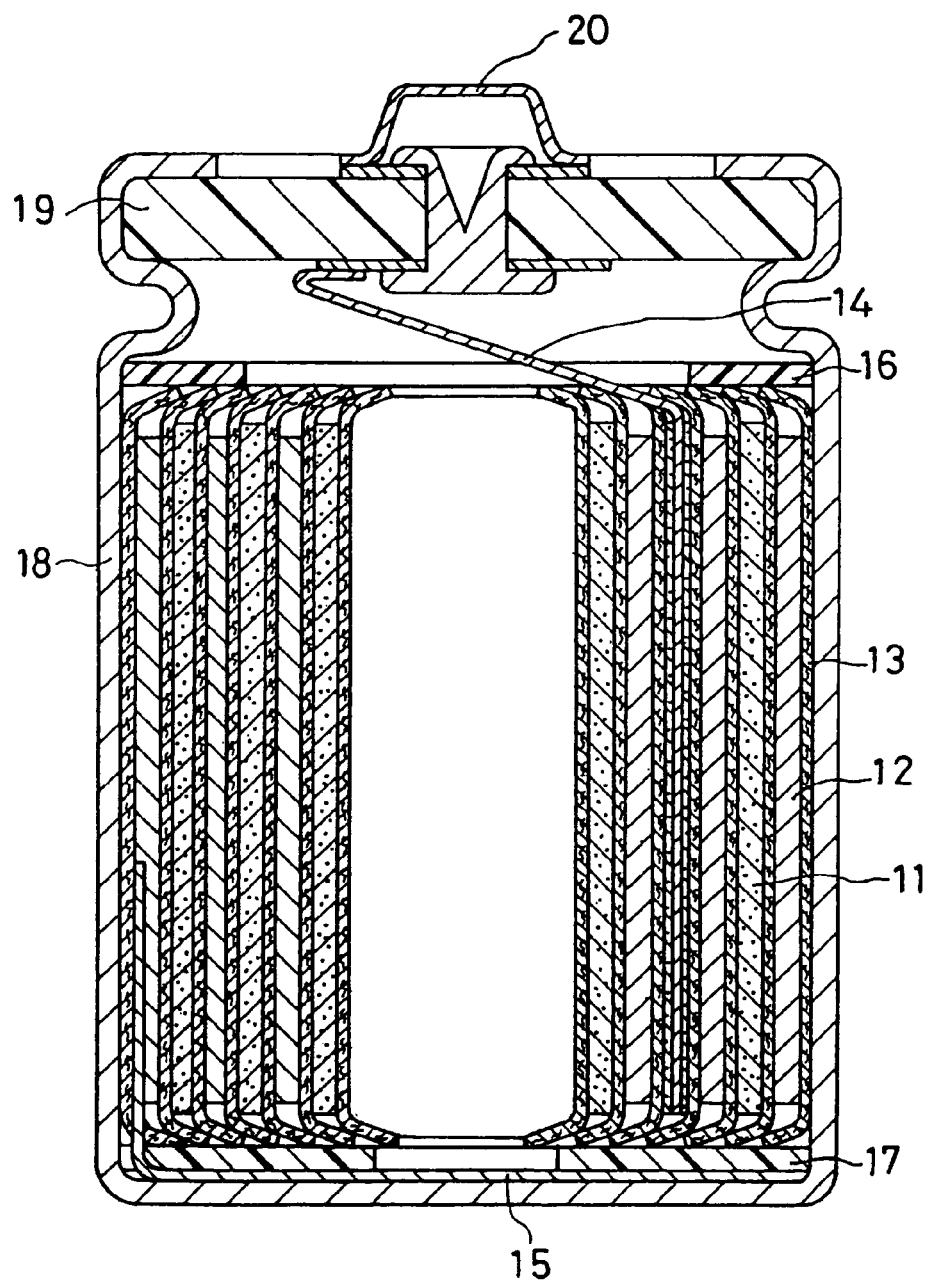
FIG. 1 is a schematic longitudinal sectional view showing the structure of a cylindrical lithium ion secondary battery used in an Example of the present invention.

A negative electrode of the present invention comprises a current collector and an active material layer carried on the current collector, and the active material layer comprises a negative electrode active material capable of electrochemically absorbing and desorbing lithium. The present invention is characterized in that lithium is absorbed in the negative electrode active material before an electrode assembly is formed by bringing lithium metal into contact with a surface of the negative electrode active material layer to physically react the lithium with the negative electrode active material.

The representative method by which lithium is physically absorbed in the negative electrode active material is heating. Heating is easiest to handle and suited for mass production. Another method is to bring lithium metal into contact with the negative electrode active material under pressure. As a result of the contact under pressure, a solid phase reaction occurs between the lithium and the negative electrode active material, so that the lithium is absorbed in the negative electrode active material.

According to these physical methods, the lithium absorption reaction can proceed uniformly and lithium can be absorbed in the negative electrode active material before a battery is assembled, in comparison with the electrochemical method of lithium absorption. Thus, these methods are unlikely to result in poor current collection.

According to the present invention, it is therefore possible to compensate for the irreversible capacity of the negative electrode active material safely without causing the above-mentioned problems.

The negative electrode active material of the present invention capable of electrochemically absorbing and desorbing lithium may be any material if it is capable of electrochemically absorbing and desorbing lithium. The negative electrode active material is preferably a material with a discharge potential of 0 V or more and 1.5 V or less relative to lithium metal. Specific examples include graphite, non-graphitizable carbon (hard carbon), and compounds containing an element such as silicon, tin, or aluminum. In particular, silicon and silicon-containing compounds are desirable because of their high capacity. Among them, silicon oxides are particularly desirable. Silicon oxides are preferably represented by SiOx where x is a given number and 0<x<2, and more preferably 0<x≦1.0. Since the electronic conductivity of these negative electrode active materials is inherently very low, it is also preferable to add a small amount of phosphorus or a transition element.

These negative electrode active materials are preferably amorphous or low crystalline. As used herein, "low crystalline" material refers to a material with a crystal grain size of 50 nm or less. The size of a crystal grain is calculated from the half width of the most intense peak in an X-ray diffraction pattern by Scherrer formula. Also, "amorphous" material as used herein refers to a material with a broad peak in the range of 2θ=15 to 40° in an X-ray diffraction pattern.

In the case of a crystalline negative electrode active material, the negative electrode active material in the form of particles or a thin film becomes cracked or destroyed when it expands due to the insertion of lithium. Consequently, the reaction area of the negative electrode active material increases, thereby resulting in an increase in the likelihood of a contact with hydrofluoric acid contained in a non-aqueous electrolyte. This promotes the dissolution reaction of Si and the deposition reaction of Si as a coating film. In contrast, an amorphous or low crystalline negative electrode active material has microscopic grain boundaries of several nm to approximately 50 nm. Thus, although it expands due to lithium insertion, the expansion stress is distributed and eased among the respective grain boundaries. As a result, such particles or film is resistant to cracking or destruction.

The above-mentioned Si-containing negative electrode active material is preferably in the form of an applied film (i.e., a film prepared by applying an electrode mixture layer comprising the active material and a binder onto a current collector), a deposited or sintered film (i.e., a film prepared by physically or chemically depositing or sintering the active material on a current collector), or the like. The active material used to form the applied film is particulate, and the particle size is preferably 0.1 μm or more and 50 μm or less.

Also, the binder may be any material if it is capable of bonding the current collector and the active material together and electrochemically inactive in the potential range of battery operation. For example, styrene-butylene copolymer rubber, polyacrylic acid, polyethylene, polyurethane, polymethyl methacrylate, polyvinylidene fluoride, polytetrafluoroethylene, carboxymethyl cellulose, methyl cellulose, and polyimide resins are suited as the binder. They may be used singly or in combination of two or more of them. With respect to the amount of the binder added, a larger amount is preferable in terms of maintaining the structure of the electrode mixture layer, but a less amount is preferable in terms of enhancing battery capacity and discharge characteristics. Further, the binder is desirably resistant to heat, since it has to be subjected to a heat-treatment.

Preferably, the applied film further contains a carbon-based conductive agent such as graphite, carbon black or carbon nanotubes. Also, such a conductive agent is preferably in contact with the negative electrode active material or integrated with the negative electrode active material.

With respect to the method for forming the deposited film, preferable physical methods include sputtering, vacuum evaporation, thermal spraying, and shot peening, and a preferable chemical method is CVD. The sintered film is desirably prepared by forming an applied film containing the negative electrode active material and then applying, for example, a heating or plasma treatment to form the sintered film.

When the negative electrode active material layer of the present invention is a deposited film or a sintered film, its thickness is preferably 3 μm or more and 50 μm or less in a discharged state of the battery. As used herein, a discharged state refers to a state in which the battery voltage is 3 V or less and the negative electrode has a potential of 0.5 V or more relative to lithium. When the thickness of the layer is less than 3 μm, the ratio of the volume of the current collector to that of the battery increases and it is thus difficult to obtain a high capacity battery. On the other hand, if the thickness of the layer is greater than 50 μm, the stress exerted by the expansion of the active material has a large impact on the current collector or the whole negative electrode, thereby causing the electrode to become wrinkled and eventually destructed. Thus, such thickness is not suitable. When the active material layer is an applied film, its thickness is preferably 10 μm or more and 100 μm or less in a discharged state for the same reason.

The lithium-based metal film desirably has a lithium content of at least 95% by weight. More desirably, the metal film is a pure lithium film. The thickness of the lithium-based metal film used in the present invention is desirably 1 μm or more and 100 μm or less, and more desirably 3 μm or more and 20 μm or less. If the thickness of the film is less than 1 μm, the irreversible capacity of the negative electrode cannot be sufficiently compensated for and it is thus impossible to realize a high capacity battery. On the other hand, if the thickness is more than 100 μm, it is difficult to diffuse lithium by heating and uneven compensation may result. Further, the formation of dendrites is likely to occur on the remaining metal film when the battery is charged and discharged. Hence, such thickness is also inappropriate in terms of safety.

With regard to the contact between the lithium-based metal film and the surface of the negative electrode active material layer, the whole surface of the metal film facing the negative electrode active material layer desirably comes into contact with the negative electrode active material layer. For this purpose, it is desirable to affix the lithium-based metal foil to the whole surface of the negative electrode and then applying a pressure thereto. Since the lithium-based metal foil is more flexible than the negative electrode, it deforms so as to conform to the shape of the negative electrode surface and closely adheres thereto. As a result, the reaction area increases, so that lithium diffuses uniformly with a high speed.

The lithium-based metal film in contact with the surface of the negative electrode active material layer is hereinafter referred to as a "precursor". This precursor is preferably heated in a low dew-point atmosphere at 80° C. or more and 200° C. or less. The low dew-point atmosphere is preferably an air atmosphere with a dew point of −40° C. or less or a fully dehydrated inert gas atmosphere such as argon or nitrogen, and more preferably such an atmosphere with a reduced pressure. In terms of preventing moisture from entering, a reduced pressure atmosphere at 50 Pa or less is particularly preferred. To obtain a reduced pressure atmosphere, it is preferred to replace the air atmosphere with such an inert gas at least once and then reduce the pressure thereof. By performing the lithium diffusion process under such conditions, it is possible to prevent deterioration of lithium and use the metal film in contact with the negative electrode active material layer effectively and evenly.

When the temperature at which lithium is physically reacted with the negative electrode active material is lower than 80° C., the diffusion of lithium proceeds very slowly, which becomes an obstacle to mass production. On the other hand, if the temperature is higher than 200° C., lithium melts since its melting point is 179° C., and the molten lithium separates or flows from the precursor, so that lithium cannot be effectively utilized. Thus, the precursor is preferably heated in the range of 100° C. or more and 170° C. or less, since lithium can be diffused efficiently and stably in this temperature range.

When the negative electrode of the present invention comprises a metal foil current collector and an active material layer carried on each side thereof, the current collector is desirably made of copper foil or copper alloy foil. In the case of copper alloy foil, the copper content is preferably 90% by weight or more. In order to improve the strength or flexibility of the current collector, it is effective that the current collector contains an element such as P, Ag, or Cr.

The thickness of the current collector is preferably 6 μm or more and 50 μm or less. If the current collector has a thickness of less than 6 μm, it is difficult to handle and, in addition, it may not have the necessary strength, so that it may become broken or wrinkled when the active material layer expands and contracts. On the other hand, if the current collector is thicker than 50 μm, the ratio of the volume of the current collector to that of the battery increases, which is disadvantageous to capacity depending on the kind of the battery. Also, if the current collector is thick, it is difficult to bend or handle.

In the step of heating the precursor, it is preferable to apply a pressure to the precursor during the heating, because the application of the pressure promotes lithium diffusion. Due to the pressure, the metal film closely adheres to the negative electrode active material layer without leaving unnecessary gaps at the interface therebetween, so that the diffusion is facilitated. The pressure is desirably a stress of at least 1 kg/cm².

The lithium-based metal film is preferably brought into contact with the negative electrode by forming a lithium-based metal film on a carrier that does not chemically react with lithium, and transferring the metal film to the surface of the negative electrode active material layer.

Particularly when the negative electrode active material layer is an applied film containing a negative electrode active material and a binder, forming a lithium-based metal film directly on the applied film causes the surface of the negative electrode active material layer to be subjected to excessively high temperatures. For example, as described above, when a film is formed by vacuum evaporation, heat of at least 400° C. is produced when lithium steam solidifies. As a result, the negative electrode active material itself crystallizes, which produces adverse effects, such as the degradation of the battery performance or the deterioration of the binder due to heat resulting in the inability to hold the negative electrode active material. Also, the lithium-based metal film is very soft and difficult to handle. Hence, forming the lithium-based metal film on a carrier allows easier handling and improves mass productivity.

In order to form the lithium-based metal film on a carrier, vacuum evaporation is preferably used to achieve the thickness of the metal film used in the present invention. In order to form the film by vacuum evaporation, a method of evaporating lithium in a vacuum by resistance heating and bringing the steam into contact with a cooled carrier is particularly preferred. The use of this method makes it possible to form the metal film stably and with a high speed.

In addition to vacuum evaporation, the lithium-based metal film is also formed by rolling. However, according to conventional rolling methods, it is difficult to achieve the thickness of the lithium film necessary in the present invention. Thus, for example, by subjecting lithium foil to a process such as shot blasting or wet blasting, with a polymer film interposed therebetween, the predetermined film thickness can be achieved.

The carrier used therein is desirably metal foil composed mainly of a transition element. Since transition elements do not chemically react with lithium to form an alloy, such a carrier can be easily separated. Among transition elements, an element such as copper or nickel is preferable as the main component of the foil. Since such an element is a high heat conductor and easily cooled, it allows lithium steam to form a flat film.

The carrier may also be an organic polymer film. Although an organic polymer film itself has low heat conductivity and low heat resistance, if it is thin and in close contact with a cooling medium, for example, if it is affixed to a cooled metal roll, it can be used as the carrier. For example, a polyethylene terephthalate film or a polyimide resin film is preferable as the organic polymer film, and its preferable thickness is 20 μm or more and 300 μm or less. If a film thinner than 20 μm is used, the film becomes broken during the formation or transfer of a lithium film or other troubles are likely to occur. In the case of a film thicker than 300 μm, the film is likely to melt where lithium is deposited because of insufficient heat exchange with the cooling medium, and the resulting metal film becomes irregular, which is not suitable.

Also, in either case of using a metal foil or an organic polymer film as the carrier, forming a release layer on the face where a lithium film is to be formed allows an improvement in mass productivity.

Further, the carrier may also be a separator used in common non-aqueous electrolyte secondary batteries. In this case, a separator with a lithium film formed thereon is disposed so as to face the negative electrode in forming an electrode assembly and a heat-treatment is applied to the resulting electrode assembly to satisfy the requirements of the present invention. This heat-treatment may be performed after the electrode assembly is inserted in a battery case, but the heat-treatment may be preferably performed immediately after the electrode assembly is formed. In this case, due to the heat-treatment, lithium is absorbed in the negative electrode, so the electrode assembly becomes thinner and can be easily inserted into the battery case.

As described above, in a preferable embodiment of the present invention, lithium is reacted with the negative electrode active material by brining the lithium-based metal film, which is formed on the carrier that does not chemically react with lithium, into contact with the negative electrode active material layer while heating and applying a pressure thereto. According to this method, lithium can be diffused stably and with a high speed to obtain a negative electrode whose irreversible capacity is compensated for without any adverse influence from excessive heat.

The non-aqueous electrolyte secondary battery of the present invention includes the above-described negative electrode, a positive electrode capable of electrochemically absorbing and desorbing lithium, and a non-aqueous electrolyte.

The positive electrode may be any material that is known as a positive electrode for use in non-aqueous electrolyte secondary batteries, and there is no particular limitation. The positive electrode may be produced by conventional methods. For example, a positive electrode active material, a conductive agent such as carbon black, and a binder such as polyvinylidene fluoride are mixed in a liquid phase, and the resulting paste is applied onto a positive electrode current collector made of, for example, Al, dried and rolled to obtain a positive electrode.

The positive electrode active material may be any material that is known as a positive electrode active material for use in non-aqueous electrolyte secondary batteries, and there is no particular limitation. However, lithium-containing transition metal compounds are preferred. Representative lithium-containing transition metal compounds include, but are not limited to, $LiCoO_2$, $LiNiO_2$, $LiMn_2O_4$, and $LiMnO_2$. Such compounds in which the transition element is replaced with another metal element may also be used preferably. Such examples include $LiCo_{1-x}Mg_xO_2$, $LiNi_{1-y}Co_yO_2$, $LiNi_{1-y-z}Co_yMn_zO_2$ where x, y, z are integers.

The non-aqueous electrolyte may be any material known as an electrolyte for use in non-aqueous electrolyte secondary batteries, and there is no particular limitation. However, an electrolyte comprising a non-aqueous solvent and a lithium salt soluble therein is preferred. The non-aqueous solvent is commonly a solvent mixture containing a cyclic carbonate, such as ethylene carbonate or propylene carbonate, and a chain carbonte, such as dimethyl carbonate, diethyl carbonate, or ethyl methyl carbonate. The non-aqueous solvent may contain, for example, γ-butyrolactone or dimethoxyethane. Also, the main supporting electrolyte contained in the non-aqueous electrolyte is lithium hexafluorophosphate, and its concentration is desirably 0.5 mol/L or more and 2 mol/L or less. When lithium hexafluorophosphate is used as the main supporting electrolyte of a non-aqueous electrolyte, it makes battery characteristics better than other lithium salts. Further, in addition to the above-mentioned amount of lithium hexafluorophosphate, a small amount of another lithium salt, such as lithium tetrafluoroborate or an imide-lithium salt, may also be added.

In order to prevent an internal short-circuit between the positive electrode and the negative electrode, a separator is interposed therebetween. The separator may be made of any material that is suitably permeable to the non-aqueous electrolyte and prevents a contact between the positive electrode and the negative electrode. A microporous film made of, for example, polyethylene or polypropylene is commonly used in non-aqueous electrolyte secondary batteries and its thickness is typically 10 μm or more and 30 μm or less.

The present invention is applicable to non-aqueous electrolyte secondary batteries of various shapes, such as cylindrical, flat, coin, and prismatic shapes, and the shape of the battery is not particularly limited. The present invention is applicable to batteries of various sealing types, including batteries composed of power generating elements, such as electrodes and an electrolyte, that are housed in a metal battery can or a laminate film case, and the way by which the battery is sealed is not particularly limited.

The present invention is hereinafter described more specifically by way of Examples and Comparative Examples. The following Examples, however, are merely indicative of preferable modes of the present invention and are not to be construed as limiting in any way the present invention.

EXAMPLE 1

In Examples and Comparative Examples, negative electrodes and cylindrical batteries were produced in the following manner, and their cycle life and discharge capacity were evaluated.

(1) Preparation of Negative Electrode

A SiO ingot (purity 99.999%, available from Furuuchi Chemical Corporation) was placed in a graphite crucible. Electrolytic copper foil (thickness 20 μm, available from Furukawa Circuit Foil Co., Ltd.), serving as a current collector sheet, was affixed to a water-cooled roller in a vacuum evaporation device. The graphite crucible with the SiO ingot therein was disposed immediately below the water-cooled roller and heated by an electron beam so that SiO was deposited on the current collector sheet in a vacuum. The deposition conditions were an acceleration voltage of −8 kV, a current of 30 mA, and a vacuum of $3\times10^{-3}$ Pa. In depositing SiO, which is sublimable, the whole surface of the SiO ingot was scanned with the electron beam in order to prevent the electron beam from concentrating on one location.

After the completion of the deposition onto one side of the current collector sheet, vacuum evaporation was also performed on the backside (undeposited side), so that a thin active material film was formed on each side. This thin film was analyzed by X-ray diffraction and the analysis showed a crystalline peak attributed to Cu of the current collector sheet and a broad peak at $2\theta=15-40°$. This result showed that the active material film was amorphous. The thickness of the active material thin film on one side of the negative electrode was approximately 15 µm. This electrode was designated as a negative electrode "a".

The negative electrode "a" was dried at 80° C. in a vacuum for 24 hours and stored in a dry atmosphere with a dew point of −60° C. or less.

(2) Preparation of Precursor

Lithium metal foil (thickness 20 µm, available from Honjo Chemical Corporation) was affixed to the surface of each of the active material thin films on both sides of the negative electrode "a". In affixing the lithium metal foil, a load of 2 kg/cm² was applied and the areas of the both sides of the negative electrode to which the lithium metal foil was affixed were the same. Also, the amount of the lithium metal foil is such that it can compensate for almost all the irreversible capacity of the negative electrode. This negative electrode "a" with the lithium metal foil affixed thereto is designated as a precursor "a".

Using the precursor "a", lithium was diffused under conditions as described in Table 1. Table 1 shows the results. To confirm lithium diffusion, the lithium metal foil on the precursor surface was visually observed, and when it disappeared, lithium diffusion was confirmed. During the evaluation, no load was applied to the precursor "a". The negative electrodes after the lithium diffusion process were designated as a-0 to a-11. Separately, one precursor "a" with the lithium foil affixed thereto was left at room temperature, and this was designated as "a-12".

As used herein, the term "vacuum atmosphere" refers to an atmosphere obtained by repeating evacuation with a vacuum pump and substitution of argon gas (99.999% available from Nippon Sanso Corporation) twice, increasing the pressure of the argon gas to the atmospheric pressure, and reducing the pressure to 10 Pa. The term "dry atmosphere" refers to an air atmosphere that has been dehydrated to a dew point of −60° C.

In Table 1, when no change was observed in the lithium metal foil on the precursor surface, it was expressed as "x". When a part of the active material layer was seen due to partial lithium diffusion, it was expressed as "Δ". Also, when only the active material layer was seen due to complete lithium diffusion, it was expressed as "○". The results show that after 24 hours from the start of heating no diffusion occurred at 60° C. in the negative electrode a-0, and that it was 48 hours later that a part of the lithium started to diffuse. This indicates that the diffusion is very slow at 60° C.

At 80° C., the lithium could not completely diffuse into the negative electrode a-1 after 24 hours from the start of heating. Also, at a temperature above 200° C., which is higher than the melting point of lithium of the negative electrode a-7, the lithium melted on the precursor and flew out of the negative electrode. In the case of the negative electrodes a-8 and a-9 where lithium was diffused at the atmospheric pressure in an argon atmosphere, the diffusion tended to be slower than in a vacuum under the same temperature condition.

With respect to the negative electrodes a-10 and a-11 where lithium was diffused in a dry atmosphere, at any temperature, the lithium did not diffuse completely and a part of the lithium remained. When the residual lithium was analyzed, a thick lithium oxide layer was found on the surface. This result indicates that the lithium oxide layer on the surface suppressed the lithium diffusion reaction. Also, as for the negative electrode a-12 which was left at room temperature, no diffusion proceeded even after 48 hours.

Using these negative electrodes a-0 to 12, batteries were assembled.

(3) Preparation of Positive Electrode

A positive electrode active material, $LiCoO_2$, was synthesized by mixing $Li_2CO_3$ and $CoCO_3$ in a predetermined molar ratio and heating the mixture at 950° C., and then classified into particle sizes of 45 µm or less. A positive electrode mixture paste was prepared by fully mixing 100 parts by weight of the positive electrode active material with 5 parts by

TABLE 1

| Negative electrode | Temperature (° C.) | Atmosphere | After 5 min | After 10 min | After 30 min | After 1 hr | After 5 hr | After 24 hr | After 48 hr |
|---|---|---|---|---|---|---|---|---|---|
| a-0 | 60 | Vacuum (10 Pa) | x | x | x | x | x | x | Δ |
| a-1 | 80 | Vacuum (10 Pa) | x | x | x | x | Δ | Δ | Δ |
| a-2 | 100 | Vacuum (10 Pa) | x | x | x | Δ | ○ | ○ | ○ |
| a-3 | 130 | Vacuum (10 Pa) | x | Δ | Δ | ○ | ○ | ○ | ○ |
| a-4 | 150 | Vacuum (10 Pa) | Δ | Δ | ○ | ○ | ○ | ○ | ○ |
| a-5 | 170 | Vacuum (10 Pa) | Δ | ○ | ○ | ○ | ○ | ○ | ○ |
| a-6 | 200 | Vacuum (10 a) | ○ | ○ | ○ | ○ | ○ | ○ | ○ |
| a-7 | 230 | Vacuum (10 Pa) | Melted | — | — | — | — | — | — |
| a-8 | 130 | Ar atmosphere (Atmospheric pressure) | x | x | Δ | Δ | ○ | ○ | ○ |
| a-9 | 150 | Ar atmosphere (Atmospheric pressure) | x | Δ | Δ | ○ | ○ | ○ | ○ |
| a-10 | 130 | Dry atmosphere | x | x | x | x | Δ | Δ | Δ |
| a-11 | 150 | Dry atmosphere | x | x | Δ | Δ | Δ | Δ | Δ |
| a-12 | — | Dry atmosphere | x | x | x | x | x | x | x | weight of acetylene black serving as a conductive agent, 4 parts by weight of polyvinylidene fluoride as a binder, and a suitable amount of N methyl-2-pyrrolidone as a dispersion medium.

The positive electrode mixture paste was applied onto both sides of a current collector comprising a 15-μm-thick aluminum foil (available from Showa Denko K.K.), dried and rolled. As a result, a positive electrode comprising the current collector and the positive electrode mixture layer carried on each side thereof was obtained.

The positive electrode was stored at room temperature in a dry atmosphere with a dew point of −60° C. or less. Immediately before a battery was assembled, the electrode was dehydrated by vacuum drying at 80° C.

(4) Production of Cylindrical Battery

Cylindrical lithium ion secondary batteries as illustrated in FIG. 1 were produced.

A positive electrode 11 and a negative electrode 12 were cut to a predetermined size. The current collector of the positive electrode was connected with one end of an aluminum positive electrode lead 14. The current collector of the negative electrode was connected with one end of a nickel negative electrode lead 15. Thereafter, the positive electrode 11 and the negative electrode 12 were wound together with a separator 13 interposed therebetween to form an electrode assembly. The separator 13 was a 20-μm-thick polyethylene resin microporous film which is wider than the two electrodes. The electrode assembly was then vacuum dried at 60° C. in a dry atmosphere with a dew point of −60° C. for 10 hours, to eliminate the moisture contained in the electrode assembly. It should be noted that the water content in the battery was also reduced by fully drying the separator 13 and other battery components in advance. The outer face of the electrode assembly was covered with the separator 13. An upper insulating ring 16 and a lower insulating ring 17 were fitted to upper and lower faces of the electrode assembly, respectively, which was then inserted into a battery can 18. Subsequently, a non-aqueous electrolyte was injected into the battery can to impregnate the electrode assembly. The other end of the positive electrode lead 14 was welded to the backside of a positive electrode terminal 20, which was fixed to the center of an insulating sealing plate 19. The other end of the negative electrode lead 15 was welded to the inner bottom face of the battery can. Lastly, the opening of the battery can 18 was closed with the sealing plate 19. In this way, a cylindrical lithium ion secondary battery was completed.

A non-aqueous electrolyte was prepared by dissolving lithium hexafluorophosphate at a concentration of 1 mol/L in a solvent mixture of ethylene carbonate and diethyl carbonate in a volume ratio of 1:1.

Batteries made with the negative electrodes a-0 to a-11 which were heat treated for 1 hour are designated as batteries 0 to 11, respectively. Also, a battery made with the negative electrode a-12 which was not heat-treated is designated as a battery 13.

(5) Evaluation of Battery i) Discharge Capacity

In a 20° C. constant temperature oven, cylindrical batteries were charged at a constant current of 100 mA until the battery voltage became 4.05 V and then discharged at a constant current of 100 mA until the battery voltage became 2.0 V. By measuring the discharge capacity then, the rated capacities of the cylindrical batteries were determined. The tested cylindrical batteries were designed to have a rated capacity of 2000 mAh. These batteries were charged at a constant charge current of 0.2 C (1 C is a 1 hour-rate current) until the battery voltage reached 4.05 V and then charged at a constant voltage of 4.05 V until the current value became 0.01 C. Thereafter, the batteries were discharged at a current of 0.2 C until the battery voltage became 2.0 V. Table 2 shows the discharge capacities obtained.

ii) Cycle Life

After the measurements of the discharge capacities of the batteries, the following charge/discharge cycle was repeated in a 20° C. constant temperature oven.

Specifically, the batteries were charged at a constant charge current of 1 C until the battery voltage became 4.05 V and then charged at a constant voltage of 4.05 V until the current value became 0.05 C. Thereafter, the batteries were discharged at a current of 1 C until the battery voltage became 2.5 V. This cycle was repeated, and the percentage of the discharge capacity at the 100th cycle relative to the discharge capacity at the 2nd cycle was obtained as the capacity retention rate (%). Table 2 shows the results. The cycle life is better as the capacity retention rate is closer to 100%.

TABLE 2

| Negative electrode | Battery | Li thickness (μm) | Temperature (° C.) | Atmosphere | Processing time (hr) | Discharge capacity (mAh) | Capacity retention rate (%) |
|---|---|---|---|---|---|---|---|
| a-0 | 0 | 20 | 60 | Vacuum (10 Pa) | 1 | 1510 | 71 |
| a-1 | 1 | 20 | 80 | Vacuum (10 Pa) | 1 | 1680 | 85 |
| a-2 | 2 | 20 | 100 | Vacuum (10 Pa) | 1 | 1850 | 88 |
| a-3 | 3 | 20 | 130 | Vacuum (10 Pa) | 1 | 1970 | 92 |
| a-4 | 4 | 20 | 150 | Vacuum (10 Pa) | 1 | 1980 | 93 |
| a-5 | 5 | 20 | 170 | Vacuum (10 Pa) | 1 | 1980 | 92 |
| a-6 | 6 | 20 | 200 | Vacuum (10 Pa) | 1 | 1980 | 85 |
| a-7 | 7 | 20 | 230 | Vacuum (10 Pa) | 1 | 1610 | 79 |
| a-8 | 8 | 20 | 130 | Ar atmosphere (Atmospheric pressure) | 1 | 1690 | 77 |
| a-9 | 9 | 20 | 150 | Ar atmosphere (Atmospheric pressure) | 1 | 1790 | 79 |
| a-10 | 10 | 20 | 130 | Dry atmosphere | 1 | 1630 | 75 |
| a-11 | 11 | 20 | 150 | Dry atmosphere | 1 | 1700 | 77 |
| a | 12 | — | — | — | — | 1200 | 94 |
| a-12 | 13 | 20 | — | Dry atmosphere | — | 1430 | 68 |

COMPARATIVE EXAMPLE

A cylindrical battery was produced in the same manner as in Example 1 except that no lithium foil was affixed to the negative electrode "a". This is designated as a battery 12.

The above results show that the batteries 0 to 11 and the battery 13 have higher capacities than the battery 12 of Comparative Example where no lithium foil was affixed to the negative electrode. This is because the affixed lithium foil reacted with the negative electrode to compensate for the irreversible capacity of the negative electrode. However, since the amount of compensation changes with the temperature at which lithium is diffused, there were variations in the battery capacities obtained. When the temperature is lower than 80° C., the battery capacity is significantly lower than those when the temperature is 80° C. or more, which indicates that lithium is not sufficiently diffused. In view of these results, it is preferred in the present invention that the lithium diffusion process be performed at 80° C. or more and 200° C. or less in order to obtain high capacity.

In comparison with the batteries made with the negative electrodes that were subjected to a diffusion process under a vacuum, the batteries made with the negative electrodes that were treated in an argon or dry air atmosphere have low capacities. This is because under such conditions the affixed lithium is more likely to deteriorate than in a vacuum atmosphere due to the moisture or oxygen contained in the gas and, hence, it reacts with the negative electrode less actively.

The battery 13, which was made with the negative electrode that was affixed with lithium but was not heated, has a lower capacity than the batteries 1 to 11. When this battery was disassembled and examined after the charge/discharge, a part of the lithium foil was found on the negative electrode surface. Also, it was found that the remaining lithium foil made the negative electrode surface irregular, thereby promoting the occurrence of an internal short-circuit during the charge/discharge reactions. These results indicate that it is effective not only to bring the lithium foil into contact with the active material layer but also to heat it for reaction before the battery is assembled.

EXAMPLE 2

Lithium foil was affixed to the negative electrode "a" in the same manner as in Example 1, and lithium was diffused at 130° C. in a vacuum atmosphere at 10 Pa under various pressures. These negative electrodes are designated as a-13 to a-16. Also, lithium was diffused at 80° C. under various pressures in the same manner. These negative electrodes are designated as a-17 to a-20. Further, the precursor "a" was left at room temperature under a load of 20 kg/cm² and its change was monitored. This negative electrode is designated as a-12'. Table 3 shows these results together with the results of the negative electrodes a-3 and a-1.

TABLE 3

| Negative electrode | Temperature (° C.) | Pressure (kg/cm²) | After 5 min | After 10 min | After 30 min | After 1 hr |
|---|---|---|---|---|---|---|
| a-3 | 130 | — | x | Δ | Δ | ○ |
| a-13 | 130 | 2 | Δ | Δ | ○ | ○ |
| a-14 | 130 | 5 | Δ | ○ | ○ | ○ |
| a-15 | 130 | 10 | Δ | ○ | ○ | ○ |
| a-16 | 130 | 20 | ○ | ○ | ○ | ○ |
| a-1 | 80 | — | x | x | x | x |
| a-17 | 80 | 2 | x | x | Δ | Δ |
| a-18 | 80 | 5 | x | Δ | Δ | ○ |
| a-19 | 80 | 10 | Δ | Δ | ○ | ○ |
| a-20 | 80 | 20 | Δ | ○ | ○ | ○ |
| a-12' | — | 20 | x | x | x | x |

(Note)
Atmosphere: Vacuum (10 Pa)

The results of Table 3 show that although diffusing lithium by simply affixing lithium foil is difficult, the application of a pressure can shorten the time necessary for diffusion. In particular, by applying a pressure of 20 kg/cm² even at 80° C., lithium could be completely diffused in a short time of 10 minutes. The results also indicate that even under a load of 20 kg/cm², at room temperature, no diffusion occurs in 1 hour.

Using these negative electrodes, cylindrical batteries were assembled in the same manner as in Example 1. Batteries made with the negative electrodes a-13 to a-20 and a-12' and with the processing times as shown in Table 4 are designated as batteries 14 to 22, respectively. The characteristics of these batteries were evaluated in the same manner as in Example 1. Table 4 shows the results.

TABLE 4

| Negative electrode | Battery | Temperature (° C.) | Pressure (kg/cm²) | Processing time (min) | Discharge capacity (mAh) | Capacity retention rate (%) |
|---|---|---|---|---|---|---|
| a-3 | 3 | 130 | — | 60 | 1970 | 92 |
| a-13 | 14 | 130 | 2 | 30 | 1980 | 94 |
| a-14 | 15 | 130 | 5 | 10 | 2000 | 96 |
| a-15 | 16 | 130 | 10 | 10 | 2000 | 96 |
| a-16 | 17 | 130 | 20 | 5 | 2010 | 95 |
| a-1 | 1 | 80 | — | 60 | 1620 | 85 |
| a-17 | 18 | 80 | 2 | 60 | 1840 | 90 |
| a-18 | 19 | 80 | 5 | 60 | 1980 | 91 |
| a-19 | 20 | 80 | 10 | 30 | 1990 | 94 |
| a-20 | 21 | 80 | 20 | 10 | 1990 | 96 |
| a-12' | 22 | — | 20 | 2880 | 1460 | 68 |

(Note)
Atmosphere: Vacuum (10 Pa)

The results of Table 4 show that by applying a pressure and heating, the lithium of the affixed lithium foil diffuses into the negative electrode to compensate for the irreversible capacity and therefore that the batteries 14 to 21 have high capacities. The results also demonstrate that the application of a pressure makes it possible to obtain a high-capacity, long-life battery even when the processing time is short. The results are particularly effective for mass production. However, the battery 22, in which only a pressure was applied, had a low capacity, since the lithium did not sufficiently diffuse even after the 48-hour process and the compensation of the irreversible capacity was insufficient. Also, this battery frequently became internally short-circuited, because a part of the lithium remained in the negative electrode surface after the charge/discharge.

EXAMPLE 3

Lithium foil was affixed to the negative electrode "a" in the same manner as in Example 1, and lithium was diffused at 130° C. in various vacuum atmospheres without applying a pressure. Table 5 shows the results. Table 5 also shows the result of a process performed at 130° C. in a vacuum atmosphere at 100 Pa under a pressure of 10 kg/cm².

TABLE 5

| Negative electrode | Temperature (° C.) | Atmosphere | Pressure (kg/cm²) | After 5 min | After 10 min | After 30 min | After 1 hr |
|---|---|---|---|---|---|---|---|
| a-21 | 130 | Vacuum (100 Pa) | — | x | x | Δ | ○ |
| a-22 | 130 | Vacuum (50 Pa) | — | x | Δ | Δ | ○ |
| a-3 | 130 | Vacuum (10 Pa) | — | x | Δ | Δ | ○ |
| a-23 | 130 | Vacuum (0.1 Pa) | — | Δ | Δ | ○ | ○ |
| a-24 | 130 | Vacuum (0.01 Pa) | — | Δ | Δ | ○ | ○ |
| a-25 | 130 | Vacuum (100 Pa) | 10 | Δ | ○ | ○ | ○ |

The results demonstrate that even in any vacuum atmosphere, lithium completely diffuses after 1 hour. The results also indicate that even at a low vacuum (100 Pa), the application of a pressure facilitates diffusion (negative electrode a-25). Using these negative electrodes, cylindrical batteries were assembled in the same manner as the above and their characteristics were evaluated. Table 6 shows the results.

TABLE 6

| Negative electrode | Battery | Temperature (° C.) | Atmosphere | Pressure (kg/cm²) | Processing time (min) | Discharge capacity (mAh) | Capacity retention rate (%) |
|---|---|---|---|---|---|---|---|
| a-21 | 23 | 130 | Vacuum (100 Pa) | — | 60 | 1920 | 86 |
| a-22 | 24 | 130 | Vacuum (50 Pa) | — | 60 | 1960 | 90 |
| a-3 | 3 | 130 | Vacuum (10 Pa) | — | 60 | 1970 | 92 |
| a-23 | 25 | 130 | Vacuum (0.1 Pa) | — | 30 | 1980 | 93 |
| a-24 | 26 | 130 | Vacuum (0.01 Pa) | — | 30 | 1980 | 95 |
| a-25 | 27 | 130 | Vacuum (100 Pa) | 10 | 10 | 2000 | 94 |

The results of Table 6 show that all the batteries have high capacities and long lives. In particular, the negative electrodes prepared in an environment at a vacuum of 50 Pa or less exhibited higher capacities and longer lives. The reason is probably as follows. Such an environment contains almost no gas such as oxygen and has a very low water content. Thus, during the lithium diffusion process, impurities are unlikely to be formed on the lithium foil surface and therefore lithium can easily diffuse into the negative electrode active material. Further, the results demonstrate that the application of a pressure is particularly effective also in this example. Even in a 100 Pa atmosphere, all the lithium is capable of diffusion in a short time of 10 minutes, and high-capacity and long-life battery characteristics can be obtained.

EXAMPLE 4

A negative electrode active material, SiO, (purity 99.9%, mean particle size 20 μm, maximum particle size 45 μm, available from Sumitomo Titanium Corporation), graphite, and acetylene black serving as a conductive agent were mixed together in a weight ratio of 45:52:3. 100 parts by weight of this powder mixture was mixed with 5 parts by weight of polyvinylidene fluoride (available from Kureha Corporation) serving as a binder, and while adding N-methyl-2-pyrrolidone, the resulting mixture was sufficiently kneaded to form a negative electrode mixture paste. The graphite used was graphite (KS4) with a mean particle size of 3 μm available from Timcal Ltd. Also, the acetylene black used was DENKA BLACK available from Denki Kagaku Kogyo K.K. The SiO used was analyzed by X-ray diffraction and the result showed that it had an amorphous structure.

The negative electrode mixture paste was applied onto both sides of a current collector comprising a 10-μm-thick electrolytic copper foil (available from Furukawa Circuit Foil Co., Ltd.), dried and rolled. As a result, a negative electrode comprising the current collector and the negative electrode active material layer carried on each side thereof was obtained. This negative electrode active material layer had a density of 1.0 g/cm³ and a porosity of 55%.

This negative electrode was dried at 80° C. in a vacuum for 24 hours and stored in a dry atmosphere with a dew point of −60° C. or less.

This negative electrode is designated as a negative electrode "b", and lithium foil (30 μm thick, Honjo Metal Co.) was affixed to the surfaces of the negative electrode active material layers (both sides) in the same manner as in Example 1. Lithium was diffused under conditions as shown in Table 7.

TABLE 7

| Negative electrode | Temperature (° C.) | Atmosphere | Pressure (kg/cm²) | After 5 min | After 10 min | After 30 min | After 1 hr | After 5 hr | After 24 hr | After 48 hr |
|---|---|---|---|---|---|---|---|---|---|---|
| b-1 | 80 | Vacuum (10 Pa) | — | x | x | x | x | x | Δ | Δ |
| b-2 | 100 | Vacuum (10 Pa) | — | x | x | x | Δ | Δ | Δ | ○ |
| b-3 | 130 | Vacuum (10 Pa) | — | x | x | Δ | Δ | Δ | ○ | ○ |
| b-4 | 80 | Dry atmosphere | — | x | x | x | x | x | x | Δ |
| b-5 | 100 | Dry atmosphere | — | x | x | x | x | Δ | Δ | ○ |
| b-6 | 130 | Dry atmosphere | — | x | x | x | Δ | Δ | Δ | ○ |
| b-7 | — | Dry atmosphere | — | x | x | x | x | x | x | x |
| b-8 | 80 | Vacuum (10 Pa) | 10 | x | x | Δ | Δ | ○ | ○ | ○ |
| b-9 | 100 | Vacuum (10 Pa) | 10 | x | Δ | Δ | ○ | ○ | ○ | ○ |
| b-10 | 130 | Vacuum (10 Pa) | 10 | Δ | ○ | ○ | ○ | ○ | ○ | ○ |

These results indicate that although the negative electrode "b" requires more time to diffuse lithium therein than the negative electrode "a", it allows complete diffusion in 48 hours when heated to 100° C. or more. However, in the case of the negative electrode b-7 that was left at room temperature, no diffusion occurred even after 48 hours. As for the negative electrodes b-8 to b-10 to which a load of 10 kg/cm² was applied, diffusion was confirmed in a short period of time compared with the negative electrodes to which no pressure was applied, just like the negative electrode "a". The difference between these negative electrodes "b" and the negative electrode "a" is believed to result from the size of the protrusions and depressions on the negative electrode surface. In the case of the negative electrode "a" where the active material layer is a thin film, the difference between the protrusions and the depressions was approximately 1 to 2 μm, whereas the difference in the negative electrode "b" was as much as 9 μm as determined with a surface roughness meter. Due to such large difference between the area where the lithium foil comes into contact with the negative electrode surface and the area where it doesn't, the reaction proceeded unevenly and the lithium diffusion was slow.

Using these negative electrodes, batteries 28 to 37 were assembled and their characteristics were evaluated. Table 8 shows the results. Further, as a Comparative Example, a battery was assembled in the same manner without affixing lithium foil to the negative electrode "b". This negative electrode is designated as a negative electrode b-0, and the battery made with this negative electrode is designated as a battery 38.

The results of Table 8 show that by attaching lithium foil and heating, lithium diffuses into the negative electrode and therefore that high-capacity and long-life battery characteristics can be obtained. When the battery 34 was disassembled to examine the negative electrode surface, a large amount of the lithium foil remained, which indicates that the diffusion did not proceed sufficiently. The results demonstrate that the use of a particulate active material can produce essentially the same effect as in the negative electrode "a".

EXAMPLE 5

In this example, lithium was diffused in a negative electrode by disposing lithium on a carrier so as to face the negative electrode and heating and pressing it.

Figure 2:
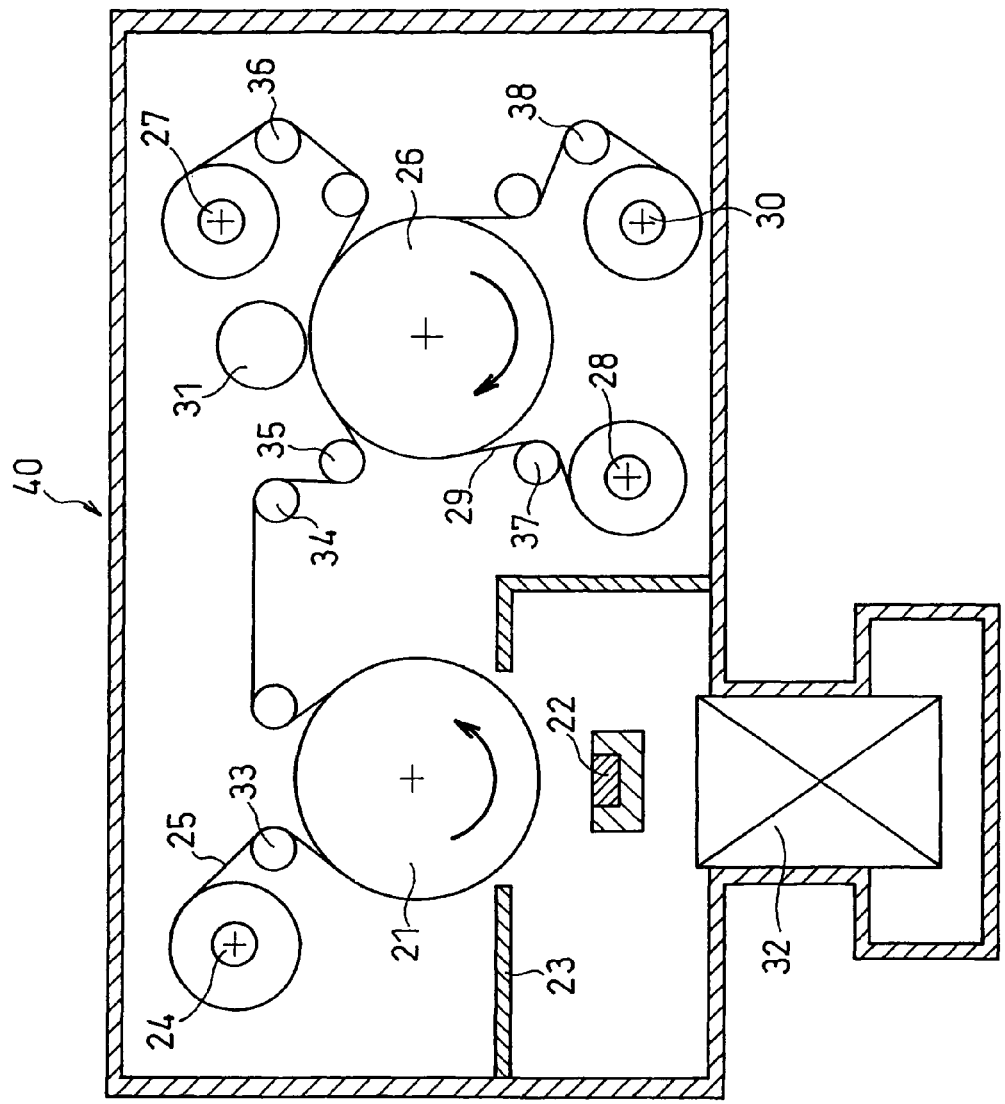
FIG. 2 is a schematic view showing the structure of a device for forming a lithium thin film on a carrier and diffusing the lithium into a negative electrode in an Example of the present invention.

FIG. 2 schematically illustrates the structure of a device used herein. A vacuum vessel 40 contains a film-forming can roll 21 and a lithium evaporation source 22. Between the film-forming can roll 21 and the lithium evaporation source 22 is a shielding plate 23, which prevents scattering of lithium to other parts than a predetermined part while preventing diffusion of heat generated by the lithium evaporation source 22.

A carrier 25 unwound from a roll 24 is transported by the rotation of the film-forming can roll 21, and lithium is deposited on the surface of the carrier 25 in the transportation process. The carrier 25 with the lithium deposited thereon is transported to a transfer can roll 26 and then wound around a rewinding roll 27. Meanwhile, a negative electrode 29 unwound from a roll 28 is transported to the transfer can roll

TABLE 8

| Negative electrode | Battery | Temperature (° C.) | Atmosphere | Pressure (kg/cm²) | Processing time (hr) | Discharge capacity (mAh) | Capacity retention rate (%) |
|---|---|---|---|---|---|---|---|
| b-1 | 28 | 80 | Vacuum (10 Pa) | — | 48 hr | 1800 | 82 |
| b-2 | 29 | 100 | Vacuum (10 Pa) | — | 48 hr | 1870 | 87 |
| b-3 | 30 | 130 | Vacuum (10 Pa) | — | 48 hr | 1940 | 90 |
| b-4 | 31 | 80 | Dry atmosphere | — | 48 hr | 1760 | 81 |
| b-5 | 32 | 100 | Dry atmosphere | — | 48 hr | 1850 | 86 |
| b-6 | 33 | 130 | Dry atmosphere | — | 48 hr | 1900 | 90 |
| b-7 | 34 | — | Dry atmosphere | — | 48 hr | 1420 | 76 |
| b-8 | 35 | 80 | Vacuum (10 Pa) | 10 | 1 hr | 1890 | 84 |
| b-9 | 36 | 100 | Vacuum (10 Pa) | 10 | 1 hr | 1910 | 90 |
| b-10 | 37 | 130 | Vacuum (10 Pa) | 10 | 1 hr | 1950 | 92 |
| b-0 | 38 | — | — | — | — | 1100 | 63 |

26. When the negative electrode 29 is sandwiched between the carrier 25 and the outer face of the transfer can roll 26, the lithium on the carrier 25 is diffused into the negative electrode 29. After the transfer can roll 26, the negative electrode 29 is wound around a roll 30.

A heating roll 31 is disposed at the position where the negative electrode 29 and the carrier 25 face each other on the transfer can roll 26, so that the carrier and the negative electrode can be heated and subjected to a pressure at the same time. The application of a pressure was controlled by changing the position of the heating roll 31 and the degree of pressing it toward the transfer can roll 26. The vacuum vessel 40 containing these rolls was evacuated with a vacuum pump 32 to control the atmosphere. The vacuum vessel 40 also contains rolls 33 to 38 for changing the transportation direction of the carrier 25 and the negative electrode 29.

In this example, a polyimide film (trade name Kapton, available from Dupon-Toray Co., Ltd.) was used as the carrier. The film-forming can roll was cooled by water. As the lithium evaporation source, an evaporation boat made of tantalum (available from Furuuchi Chemical Corporation) was used, and a lithium metal rod (available from Honjo Chemical Corporation) was placed in the boat. This boat was connected to a direct current power source placed outside the vacuum vessel, and lithium was evaporated in a vacuum by resistance heating. The rotation speed of the film-forming can roll was set to 10 cm/min, and the temperature of the roller surface was maintained at 20° C. This operation was performed in an environment at a vacuum of 0.3 Pa, and the pressure was raised to the atmospheric pressure by introducing argon (available from Nippon Sanso Corporation, purity 99.999%) and oxygen (available from Nippon Sanso Corporation, purity 99.999%) in a volume ratio of 95:5.

The lithium deposited on the carrier had a thickness of approximately 20 μm, with a very even and flat surface. Using the negative electrode "a", the lithium on the carrier was diffused into the negative electrode under various temperature and pressure conditions. Table 9 shows the results. The temperature in Table 9 is the temperature of the heating roll itself.

Using these negative electrodes, cylindrical batteries were assembled in the same manner as in Example 1 and their characteristics were evaluated. Table 9 also shows the results.

The results of Table 9 shows that at 20° C. no lithium diffusion occurred and the lithium completely remained on the carrier. At 60° C., the diffusion did not proceed sufficiently and the irreversible capacity was not sufficiently compensated for, thereby resulting in low capacities. The negative electrodes treated at 80° C. and 120° C. exhibited high capacities. Further, increasing the pressure facilitated lithium diffusion, and the discharge capacity tended to increase accordingly.

Since such an approach eliminates the need to directly handle thin lithium foil, it allows easy handling and is suited for mass production.

Next, using a carrier made of copper foil (electrolytic foil with a thickness of 11 μm, available from Nippon Foil Mfg. Co., Ltd.), the same process was performed. Table 10 shows the results. The lithium deposited on the copper foil carrier had an average thickness of 20 μm, but the variations in thickness were ±3 μm, which is larger than those of the above-mentioned polyimide film. The reason is ascribed to the electrolytic foil used as the copper foil. Since the electrolytic foil has microscopic protrusions and depressions, it comes into contact with the film-forming can roll on a point-to-point basis. On the other hand, since the polyimide film can extend so as to conform to the protrusions and depressions on the film-forming can roll, the substantially whole surface thereof can come into contact with the film-forming can roll. This difference is believed to create a difference in cooling ability, thereby resulting in the large variations in the thickness of the lithium on the copper foil carrier.

Using the above-mentioned carrier with the lithium, the same process was performed by applying a pressure of 10 kg/cm$^2$ by means of the heating roll and at various heating temperatures. Using the negative electrodes thus obtained, batteries were assembled, and their characteristics were evaluated. Table 10 also shows the results.

TABLE 9

| Negative electrode | Temperature (° C.) | Pressure (kg/cm$^2$) | Lithium diffusion | Battery | Discharge capacity (mAh) | Capacity retention rate (%) |
|---|---|---|---|---|---|---|
| a-26 | 20 | 1 | Not diffused | 39 | 1250 | 91 |
| a-27 | 60 | 1 | Partially diffused | 40 | 1430 | 87 |
| a-28 | 80 | 1 | ∘ | 41 | 1890 | 90 |
| a-29 | 120 | 1 | ∘ | 42 | 1930 | 91 |
| a-30 | 20 | 5 | Not diffused | 43 | 1290 | 93 |
| a-31 | 60 | 5 | Partially diffused | 44 | 1510 | 88 |
| a-32 | 80 | 5 | ∘ | 45 | 1910 | 91 |
| a-33 | 120 | 5 | ∘ | 46 | 1970 | 94 |
| a-34 | 20 | 10 | Not diffused | 47 | 1350 | 91 |
| a-35 | 60 | 10 | Partially diffused | 48 | 1840 | 89 |
| a-36 | 80 | 10 | ∘ | 49 | 2000 | 92 |
| a-37 | 120 | 10 | ∘ | 50 | 2010 | 95 |

TABLE 10

| Negative electrode | Temperature (° C.) | Pressure (kg/cm$^2$) | Lithium diffusion | Battery | Discharge capacity (mAh) | Capacity retention rate (%) |
|---|---|---|---|---|---|---|
| a-38 | 20 | 10 | Not diffused | 51 | 1290 | 85 |
| a-39 | 60 | 10 | Partially diffused | 52 | 1630 | 79 |
| a-40 | 80 | 10 | ○ | 53 | 1870 | 88 |
| a-41 | 120 | 10 | ○ | 54 | 1900 | 90 |

The results of Table 10 show that as in Table 9, at 20° C. no lithium diffusion occurred and that at 60° C. only a part of the lithium diffused. Thus, the batteries 51 and 52 exhibited low capacities, since their irreversible capacity could not be sufficiently compensated for. Also, when a comparison is made between the batteries under the same conditions in Tables 9 and 10, for example, the batteries 50 and 54, the battery 50 using the polyimide film as the carrier had a higher capacity than the battery 54 using the copper foil as the carrier. This is probably because the lithium film deposited on the copper foil carrier has large protrusions and depressions, as described above, and the resulting uneven contact interferes with the diffusion.

EXAMPLE 6

Graphite (mesocarbon microbeads (MCMB) available from Osaka Gas Chemicals Co., Ltd.) was used as the negative electrode active material. A negative electrode paste was prepared by kneading 100 parts by weight of this active material and an aqueous solution containing 1 part by weight of carboxyl methyl cellulose (Daicel Chemical Industries, Ltd.) serving as a thickener and mixing the resulting paste with 1 part by weight of styrene-butadiene copolymer rubber (JSR Corporation) as a binder.

This paste was applied onto both sides of a 10-μm-thick electrolytic copper foil, dried and rolled in the same manner as in Example 4. As a result, a negative electrode "c" comprising the current collector and the negative electrode active material layer carried on each side thereof was obtained. This negative electrode active material layer had a density of 1.65 g/cm$^3$ and a porosity of 72%.

The negative electrode "c" was dried at 110° C. in a vacuum for 24 hours and stored in a dry atmosphere with a dew point of −60° C. or less.

Using this negative electrode "c", lithium was diffused with the device of Example 5. Specifically, lithium was deposited on the surface of a polyimide film carrier so as to form a 4-μm-thick film thereon. Table 11 shows the temperatures and pressures in the lithium diffusion process. Also, using the processed negative electrodes c-2 to c-4 and unprocessed negative electrode c-1, batteries were assembled, and their characteristics were evaluated. Table 11 also shows the results.

The results of Table 11 confirm that the above-mentioned process increases battery capacity. The results of this Example also demonstrate that even in the case of using graphite, which is the commonly used negative electrode active material, compensating for its irreversible capacity makes it possible to obtain a higher capacity battery.

However, these results also indicate that the particularly preferable negative electrode active material of the present invention is a silicon compound, and that using a silicon compound as the negative electrode active material and compensating for its irreversible capacity according to the method of the present invention makes it possible to obtain a battery having a dramatically higher capacity and a longer life than conventional batteries.

EXAMPLE 7

Lithium metal foil (thickness 150 μm, available from Honjo Chemical Corporation) was placed on a glass plate, and the lithium foil was covered with a 100-μm-thick polyethylene terephthalate (PET) film (Teijin Tetoron Film HB, available from Teijin DuPont Films Japan Limited). Air was exhausted from between the PET film and the lithium foil, and the four corners of the PET film were fixed.

From above the lithium foil covered with this PET film, using a blast machine (Multi-surface Jr (MSJ2-90), available from Macoho Co., Ltd.), glass beads (bead size 38 to 53 μm, UB13L available from Union Co., Ltd.), serving as blast fine particles, were sprayed onto the PET film together with a carrier gas, which was dry air with a dew point of −65° C. At this time, the pressure of the dry air was controlled at 0.25 MPa, and the blast machine was moved leftward and rightward 10 times above the PET film. In this way, the lithium foil was drawn under the PET film to obtain a thin film. The lithium thin film had a thickness of 20 μm.

This lithium thin film was affixed to the surfaces of the active material layers on both sides of the negative electrode "a" in the same manner as in Example 1, so that lithium was diffused into the active material. Using the negative electrode thus prepared, a lithium ion secondary battery was assembled in the same manner as in Example 1 and evaluated in the same manner. As a result, almost the same result as those in Tables 1 and 2 was obtained. This demonstrates that the effects of the

TABLE 11

| Negative electrode | Temperature (° C.) | Pressure (kg/cm$^2$) | Lithium diffusion | Battery | Discharge capacity (mAh) | Capacity retention rate (%) |
|---|---|---|---|---|---|---|
| c-1 | — | — | Lithium not affixed | 55 | 950 | 93 |
| c-2 | 80 | — | Partially diffused | 56 | 1030 | 92 |
| c-3 | 80 | 10 | ○ | 57 | 1080 | 94 |
| c-4 | 120 | 10 | ○ | 58 | 1100 | 94 | present invention are not dependent on the manufacturing condition of the lithium thin film.

EXAMPLE 8

A lithium thin film was formed on the surface of a polyimide film carrier under the same conditions as those of Example 5 except that a release agent (FC-169 available from Fine Chemical Japan Co., Ltd.) was applied onto the surface of the carrier, and the lithium was diffused in the negative electrode.

The results demonstrate that the method of depositing lithium on a carrier surface with a release agent applied thereto and diffusing it into a negative electrode does not affect battery characteristics. Further, according to this method, even when only a part of the lithium on the carrier diffused into the negative electrode as in a-27, a-31, and a-35, the remaining lithium could be readily removed from the carrier. These results indicate that mass productivity can be further improved.

EXAMPLE 9

A polyethylene film (thickness 27 µm, available from Asahi Kasei Corporation) used as a separator for lithium ion batteries was used as the carrier. In the same manner as in Example 5, lithium was deposited on this separator film. This film with the lithium was disposed such that the lithium faced the negative electrode in assembling an electrode assembly. Using this electrode assembly, a battery was assembled.

Before the injection of an electrolyte, a heat-treatment was applied to diffuse the lithium on the separator into the negative electrode. Thereafter, an electrolyte was injected and the battery was sealed and evaluated. Table 12 shows the results.

TABLE 12

| Negative electrode | Temperature (° C.) | Lithium diffusion | Battery | Discharge capacity (mAh) | Capacity retention rate (%) |
|---|---|---|---|---|---|
| a-42 | 20 | Not diffused | 59 | 1260 | 91 |
| a-43 | 60 | Partially diffused | 60 | 1450 | 87 |
| a-44 | 80 | ○ | 61 | 1900 | 91 |
| a-45 | 120 | ○ | 62 | 1930 | 84 |

As in Table 9, when the heating temperature was 20° C., no lithium diffusion occurred and the lithium remained on the separator. On the other hand, the battery heat-treated at 120° C. had a high capacity, but its cycle characteristics tended to deteriorate slightly. This is probably because the heat-treatment caused the separator to melt, thereby resulting in a decrease in the pores of the separator. The results indicate that the preferable heat-treatment temperature for diffusing the lithium on the separator into the negative electrode is approximately 80° C.

The negative electrode of the present invention can provide excellent non-aqueous electrolyte secondary batteries having both high capacity and good charge/discharge cycle characteristics. The present invention is applicable to any non-aqueous electrolyte secondary batteries regardless of their shape. For example, the present invention is applicable to not only cylindrical batteries used in Examples but also coin-shaped, rectangular, and flat batteries with a wound or layered electrode assembly structure. The non-aqueous electrolyte secondary battery of the present invention is useful as the main power source for mobile communications appliances, portable electronic appliances, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing a non-aqueous electrolyte secondary battery that comprises:
a positive electrode capable of electrochemically absorbing and desorbing lithium;
a negative electrode capable of electrochemically absorbing and desorbing lithium, said negative electrode including an active material layer that comprises an active material represented by $SiO_x$ ($0<x\leq1.0$), said active material layer being carried on a current collector; and
a non-aqueous electrolyte,
said method comprising the steps of
depositing the active material by sputtering, vacuum evaporation, thermal spraying, or CVD on the current collector to form the active material layer;
reacting lithium with the active material of the negative electrode by bringing a metal film that is composed mainly of lithium into contact with a surface of said active material layer of the negative electrode to form a precursor and heating the precursor in an air atmosphere with a dew point of −40° C. or less or a dehydrated inert gas atmosphere at 130° C. or more and 170° C. or less; and
thereafter combining the negative electrode with the positive electrode to form an electrode assembly.

2. The method for producing a non-aqueous electrolyte secondary battery in accordance with claim 1, wherein said heating is conducted while applying a pressure to the precursor.

3. The method for producing a non-aqueous electrolyte secondary battery in accordance with claim 1, wherein said air atmosphere or said dehydrated inert gas atmosphere is an atmosphere with a reduced pressure of 50 Pa or less.

4. The method for producing a non-aqueous electrolyte secondary battery in accordance with claim 1, wherein said metal film composed mainly of lithium is formed on a carrier that does not chemically react with lithium, and said step of reacting lithium with the active material of the negative electrode comprises bringing said metal film on said carrier into contact with said active material layer of the negative electrode to form the precursor and heating the precursor while and applying a pressure thereto.

5. The method for producing a non-aqueous electrolyte secondary battery in accordance with claim 4, wherein said metal film is formed on said carrier by vacuum evaporation.

6. The method for producing a non-aqueous electrolyte secondary battery in accordance with claim 4, wherein said carrier comprises a metal foil composed mainly of a transition element.

7. The method for producing a non-aqueous electrolyte secondary battery in accordance with claim 4, wherein said carrier comprises an organic polymer film.

* * * * *